United States Patent [19]
Cok et al.

[11] Patent Number: 5,905,580
[45] Date of Patent: *May 18, 1999

[54] SYSTEM AND ARTICLE OF MANUFACTURE FOR PRODUCING AN INDEX PRINT FROM PHOTOGRAPHIC NEGATIVE STRIPS

[75] Inventors: David R. Cok; Jay S. Schildkraut, both of Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/668,112

[22] Filed: Jun. 21, 1996

Related U.S. Application Data

[XX .
[60] Provisional application No. 60/007,292, Nov. 9, 1995.
[51] Int. Cl.⁶ .............................. H04N 1/387; H04N 1/46
[52] U.S. Cl. ........................ 358/302; 358/401; 235/462; 355/54; 382/289
[58] Field of Search ..................................... 358/296, 302, 358/401, 403, 909.1; 235/462; 355/40, 54, 77; 382/276, 281, 289, 292, 294–296

[56] References Cited

U.S. PATENT DOCUMENTS

| | | | |
|---|---|---|---|
| 4,933,773 | 6/1990 | Shiota et al. | 358/302 |
| 5,184,227 | 2/1993 | Foley | 358/302 |
| 5,414,779 | 5/1995 | Mitch | 382/199 |
| 5,530,517 | 6/1996 | Patton et al. | 355/40 |
| 5,546,196 | 8/1996 | Huot et al. | 355/40 X |
| 5,642,443 | 6/1997 | Goodwin et al. | 382/295 X |
| 5,739,897 | 4/1998 | Frick et al. | 355/40 |

*Primary Examiner*—Peter S. Wong
*Assistant Examiner*—Gregory J. Toatley, Jr.
*Attorney, Agent, or Firm*—Peyton C. Watkins

[57] ABSTRACT

A system for creating an index print, generated from a negative strip having one or more frame images, independent of sequentially scanning each frame on the negative strip, the system includes a scanner for substantially simultaneously creating a composite digital image of the negative strip from the negative placed on the scanner independent of the position or orientation of the negative on the scanner. An image locator operatively connected to the scanner for locating each digital representation in the composite digital image of the individual frame images on the negative strip. A printer operatively connected to the locator for printing the index print from a signal from the locator.

15 Claims, 7 Drawing Sheets

Microfiche Appendix Included
(1 Microfiche, 35 Pages)

SYSTEM AND ARTICLE OF MANUFACTURE FOR PRODUCING AN INDEX PRINT FROM PHOTOGRAPHIC NEGATIVE STRIPS

CROSS REFERENCE TO RELATED APPLICATION

Reference is made to and priority claimed from U.S. Provisional application Ser. No. 60/007,292, filed Nov. 09, 1995, entitled SYSTEM AND ARTICLE OF MANUFACTURE FOR PRODUCING AN INDEX PRINT FROM PHOTOGRAPHIC NEGATIVE STRIPS.

MICROFICHE APPENDIX

The disclosure in the microfiche appendix (1 page of fiche, 35 frames) of this patent disclosure of this patent document contains material to which a claim of copyright protection is made. The copyright owner has no objection to the facsimile reproduction of any one of the patent documents or the patent disclosure, as it appears in the U.S. patent and Trademark Office patent file or records, but reserves all other rights whatsoever.

FIELD OF THE INVENTION

The invention relates generally to the field of creating photographic index prints from a negative strip typically having a plurality of image frames thereon and, more particularly, to creating index prints independent of sequentially scanning each image frame on the negative strip.

BACKGROUND OF THE INVENTION

In current conventional photographic film applications, a roll of light sensitive film having a predetermined number of exposures is selectively exposed to incident light for capturing an image to each exposure. The exposed film is processed by a photofinisher for creating photographic prints from the exposed film, and also for converting the exposed film into non-light sensitive negatives which the consumer may later use for ordering additional prints. The photographic negatives are usually in the form of strips.

When ordering additional photographic prints of interest from the negative strip, the consumer must identify the negative that produced the print of interest to the photofinisher. Unfortunately, photographic negatives are not readily viewable by the human eye, and it can be extremely difficult to identify which negative belongs with a print of interest, particularly in cases in which several almost identical exposures were taken in very rapid succession. Therefore, it is desirable to provide an index print that contains photographic images, preferably reduced in size, each having a number corresponding to a particular image frame on the negative. This permits a consumer to readily identify which negative belongs to the print of interest.

Several systems have been developed for generating index prints during the initial photofinishing process. Typical of such systems is commonly assigned U.S. Pat. No. 5,184,227 issued to Foley, for example, discloses a photographic printer with an index print generator. The printer includes a scanning device for sequentially and electronically scanning a roll of negatives as they are processed by the photographic printer. The digitized image data generated by the scanning device is supplied to an exposure determination computer that controls the operation of an optical printer light source to print the photographic negatives. In addition, the digitized image data is supplied to an index print generator that prints reduced size positive images on an index sheet using a hardcopy output printer. A corresponding index number identifying each negative frame is printed beside each positive image on the index sheet so the consumer can readily identify which negative frame belongs to which positive image.

Although the presently known and utilized systems and methods are satisfactorily, they are not without drawbacks. The index prints are typically generated during the initial photofinishing process. This requires the consumer to decide whether to generate index prints during the this initial photofinishing process which may be days, months or even years before it is actually known if index prints are needed. If it is later decided that they are not needed, obviously an un-recoverable expenditure has already occurred. In addition, the method and system for generating index prints are difficult, time consuming, labor intensive and expensive because each frame image is sequentially scanned during the printing process.

Consequently, a need exists for improvements in the system and mode of generating index prints so as to overcome the above-described drawbacks.

SUMMARY OF THE INVENTION

The present invention is directed to overcoming one or more of the problems set forth above. Briefly summarized, according to one aspect of the present invention, the invention resides in a system for creating an index print, generated from a negative strip having one or more frame images, independent of sequentially scanning each frame on the negative strip, the system comprising: (a) a scanner for substantially simultaneously creating a composite digital image of the negative strip from the negative placed on said scanner independent of the position or orientation of the negative on the scanner; (b) means for locating each digital representation in the composite digital image of the individual frame images on the negative strip, and for determining the orientation of the digital representation and, when necessary, re-orienting the digital representation to a suitable orientation; and (c) a printer for printing the index print from a signal from said locating and re-orientation means.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

In the following description, like reference characters designate like or corresponding parts throughout the several views of the drawings.

Figure 1:
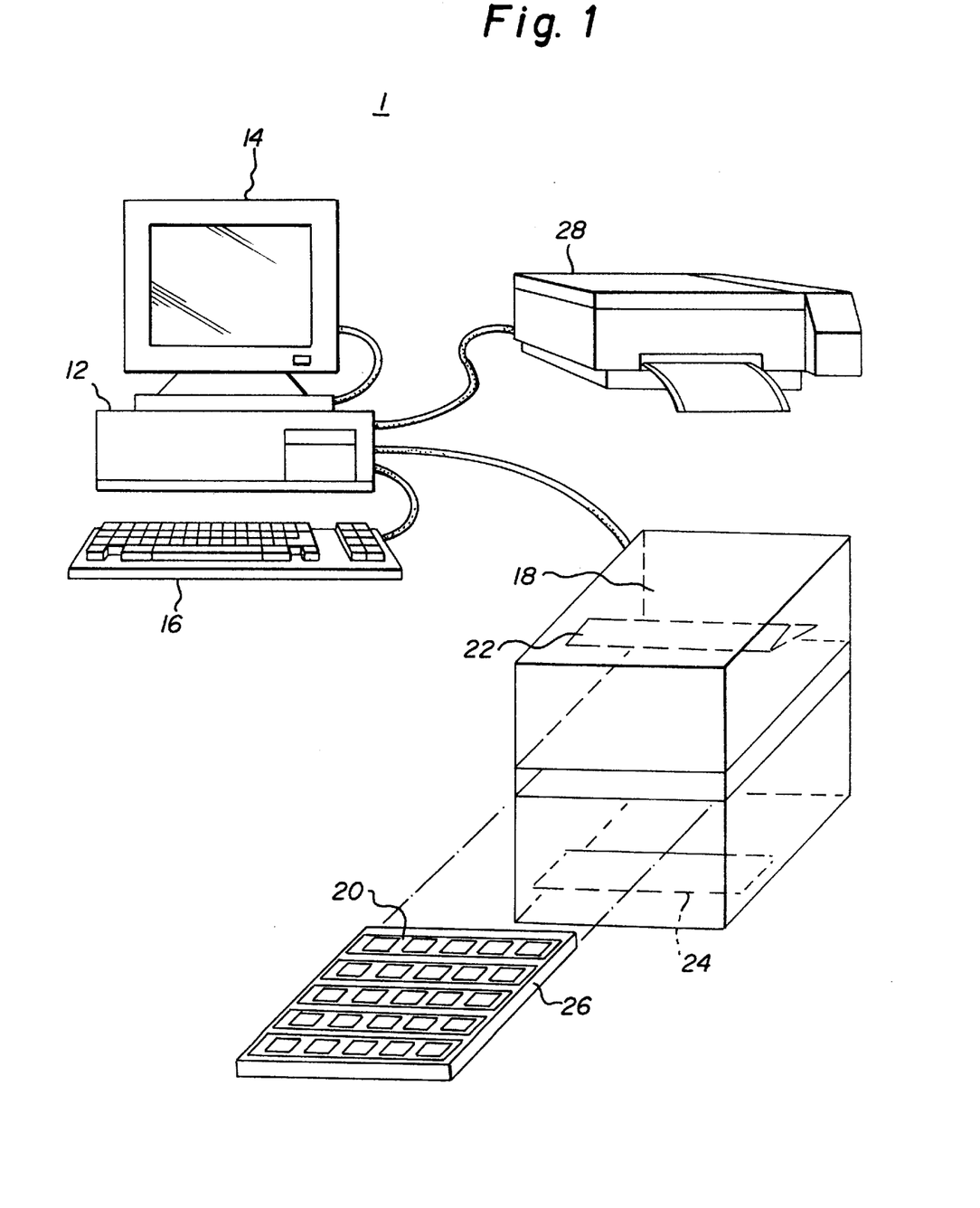
FIG. 1 is a perspective view of a computing system of the present invention.

Referring now to the drawings, and particularly to FIG. 1, there is illustrated a computer system 1 for implementing the present invention. Although the computer system 1 is shown for the purpose of illustrating a preferred embodiment, the present invention is not limited to the computer system 1 shown, but may be used on any electronic processing system. The computer system 1 includes a microprocessor based unit 12 for receiving and processing software programs and for performing other processing functions. The microprocessor based unit 12 also includes electronic memory (not shown) for electronically storing data. A display 14 is electrically connected to the microprocessor based unit 12 for displaying user related information associated with the software. A keyboard 16 and a mouse (not shown) are also connected to the microprocessor based unit 12 for allowing a user to input information to the software program.

A flatbed scanner 18, which is well known in the art, is connected to the microprocessor based unit 12 for receiving a plurality of photographic negative strips 20 each containing a photographic image, as is well known in the art. The flatbed scanner 18 includes a light source 22 for illumination of the negative strips 20, and includes a detector 24 for measuring the transmission of light through the strips. The negative strips 20 are placed in a transparent holder 26 for conveniently assembling the strips 20 together, and in the preferred embodiment, the strips and holder are inserted into the flatbed scanner 18. In an alternative embodiment, the strips 20 may be placed onto the flatbed scanner 18 without the holder 26.

The scanner 18 creates a color digital image of the negative strip 20 having a plurality of pixels typically having values between 0–255. Typically, each pixel in the digital image will contain one byte of data for each color—usually red, green and blue. The digital representation of the image is transmitted to the microprocessor based unit 12 where it is stored in memory for later processing. A printer 28, such as a thermal dye printer, inkjet printer, laser printer, electrophotostatic printer or the like, is connected to the microprocessor based unit 12 for printing a hardcopy of the processed images, in the present invention an index print as shown in FIG. 2.

Figure 2:
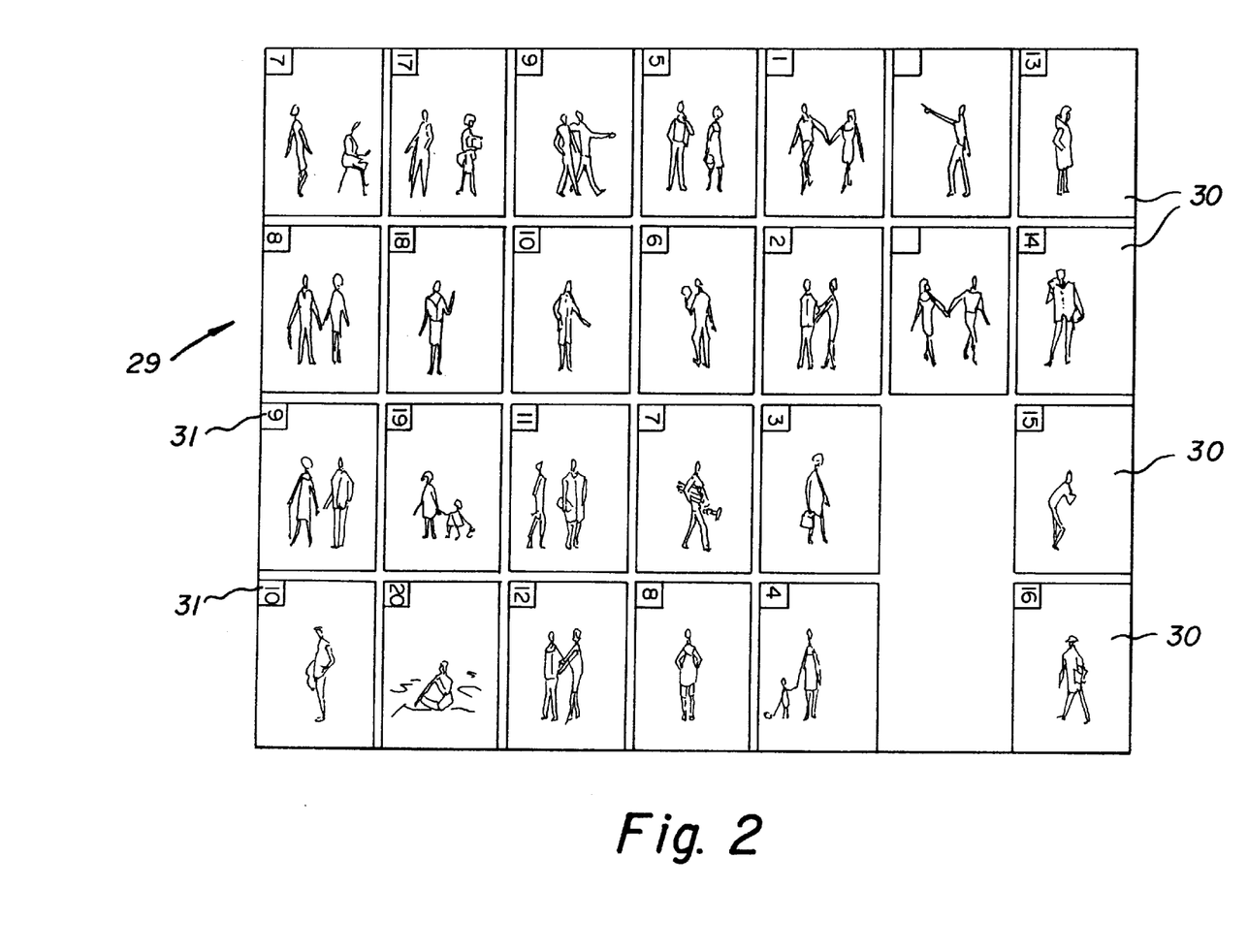
FIG. 2 is a front view of an index print.

Referring now to FIG. 2, the index print 29 is preferably printed on 8 inch by 11 inch photographic paper or an inkjet printer, and includes a plurality of photographic pictures 30 arranged in a 4 by 7 matrix configuration, although any matrix configuration may be used. Each picture 30 includes a number 31 corresponding to a number on the negative strips 20.

Figure 3:
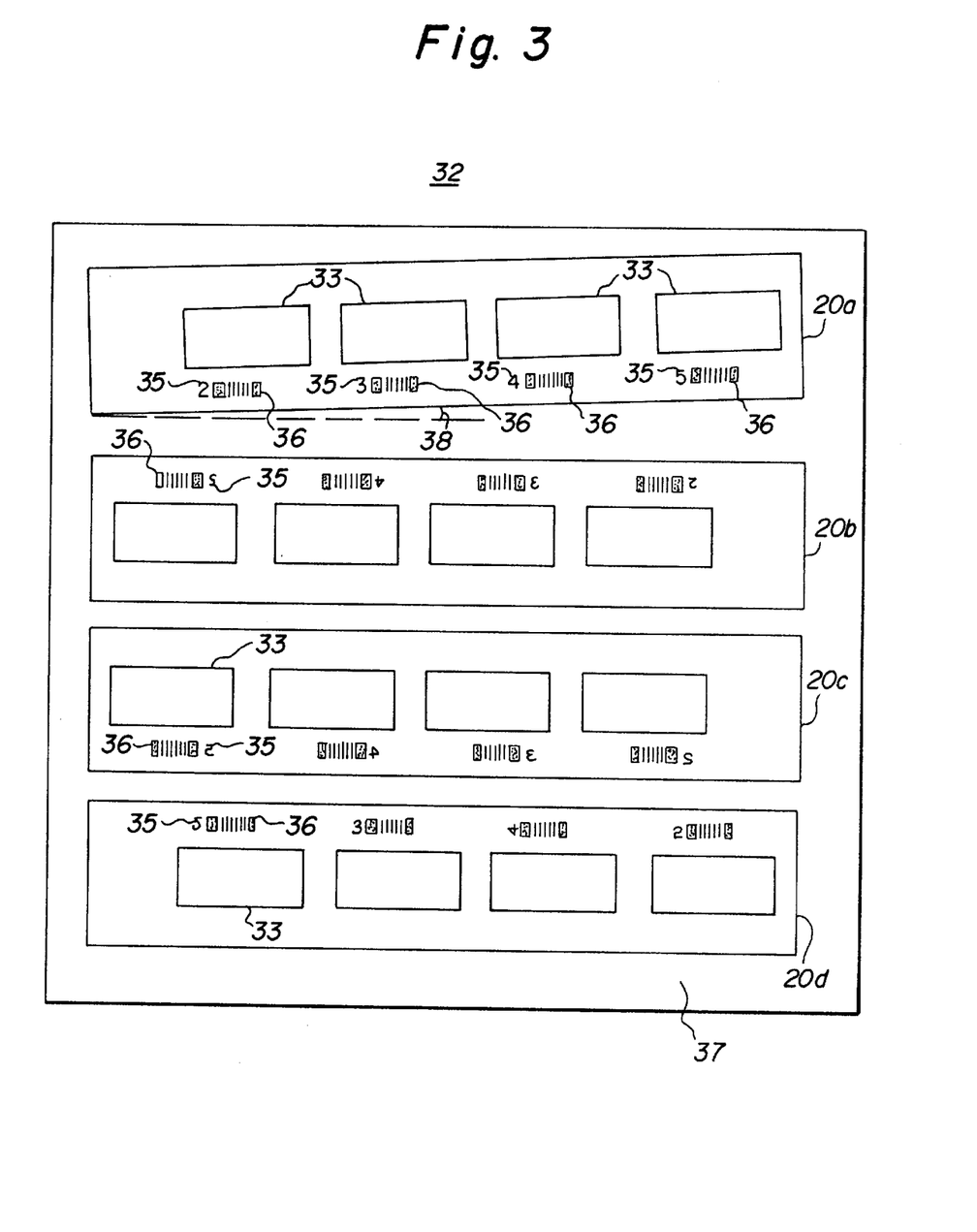
FIG. 3 is a front view of a composite digital image.

Referring to FIG. 3, a scanned composite digital image 32, i.e. the output from the scanner 18, of the negative strips 20 contained within the holder 26 is shown in detail. The negative strips 20 may be placed onto the flatbed scanner 18 in either of two methods, as previously stated.

For purposes of illustrating the contents of each strip 20, strip 20a will be discussed as an illustrative representation of each strip 20. Strip 20a includes a frame 33 containing the image, a frame number 35 associated with each frame 33, and a bar code clock track 36 containing predetermined, spaced-apart marks which, in previously utilyzed systems, permitted tracking movement of the negative strips 20. The barcodes 36 will be used for other purposes in the present invention as will become apparent later.

Strip 20a is shown in its correctly oriented position with the bar code clock track 36 at the bottom and the frame numbers 35 oriented correctly. Strip 20b is shown oriented upside-down with its barcode clock track 36 at the top and the frame numbers 35 upside-down. Strip 20c is illustrated in a backwards position with its frame numbers 35 and barcode clock track 36 reading as in a vertical mirror image. Strip 20d is illustrated in a both upside-down and backwards position with its bar code 36 and frame numbers 35 reading as in a horizontal mirror image.

It is instructive to note that each strip 20 should be placed substantially horizontally on the scanner 18, preferably with a slope 38 less than ten degrees measured from the horizontal. Strip 20a, for example, illustrates a slope 38 of approximately five degrees.

As previously stated, the scanner 18 creates a color digital image of the negative strip 20, typically each pixel in the digital will contain one byte of data for each color—usually red, green and blue. The portion of the scanned composite digital image 32 outside of the negative strips 20 is referred to as background 37, and preferably is all white (code value of 255 for all three colors).

Figure 4:
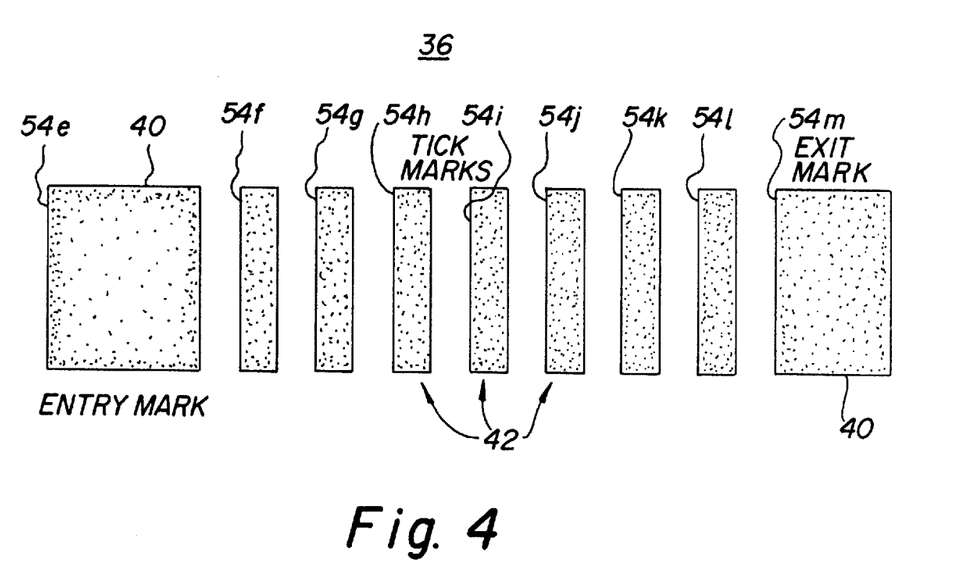
FIG. 4 is an exploded view of a typical bar code on the composite digital image.

Referring now to FIG. 4, there is illustrated an exploded view of the barcode clock track 36 having a plurality of individual marks. Typically, the first mark is an entry mark 40 for indicating the beginning of the barcode clock track 36. A plurality of tick marks 42, usually either seven or eleven marks, are adjacent the entry mark 40. An exit mark 44 is adjacent the tick marks 42 for indicating the end of the clock track 36.

Figure 5:
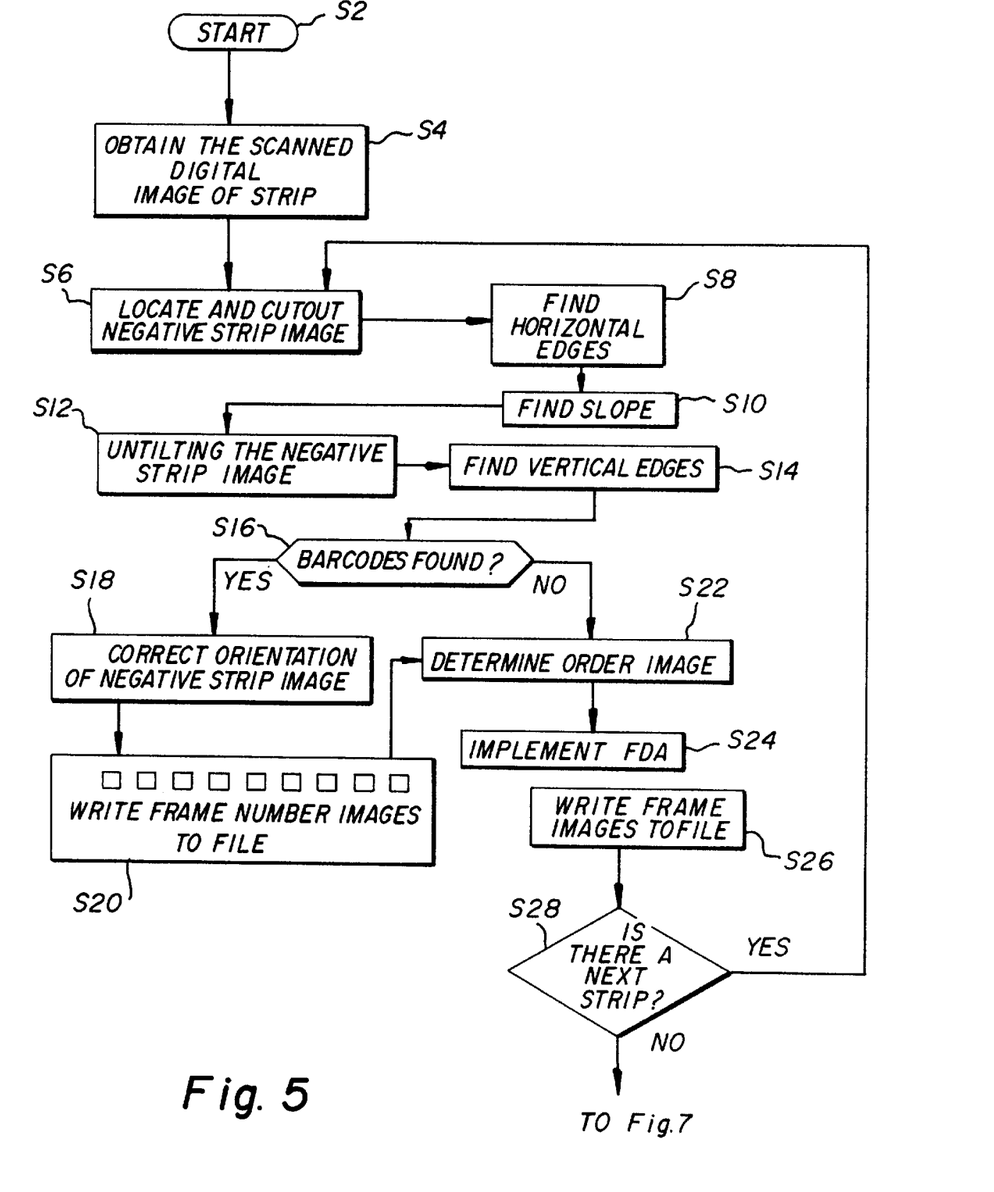
FIG. 5 a flowchart of a software program of the present invention typically implemented on a general purpose computer.
Figure 6A:
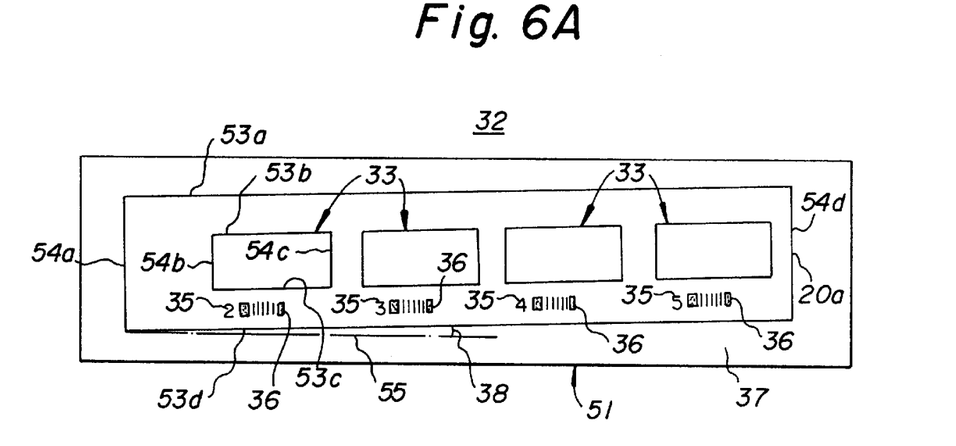
FIG. 6A is front view of a portion of the composite digital image of FIG. 4.

Referring to FIG. 5, a flowchart of a software program of the present invention is illustrated, and the software is preferably stored in memory on the microprocessor based unit 12. An appendix disclosing portions of the program code is attached hereto. Before describing the flowchart, it is instructive to note that the program is manipulating the scanned composite digital image 32 which is stored in memory of the microprocessor based unit 12. Referring both to FIGS. 5 and 6A, the program is initiated by the user S2 from the keyboard 16 and loads the scanned composite digital image 32 into memory at step S4. The portion of the scanned composite digital image 32 that includes the extreme top negative strip (strip 20a) and its surrounding background 37 is located and cutout S6 of the scanned digital image 32 for forming a negative strip image 51. Step S6 is accomplished by starting at the first line of pixels and moving down the scanned composite digital image 32 for finding a line that is not background 37, i.e. the negative strip 20a. The program continues moving down the scanned composite digital image 32 and finds the next line that is background 37. This procedure identifies a region of lines that potentially contains a negative strip 20a.

In certain instances, the scanned digital image 32 may contain a damaged portion which should be eliminated as being identified as the negative strip 20a. To accomplish this, if this region identified as the negative strip 20a is too small to actually accommodate a strip 20a, begin the search again from where the last search ended and continue searching as described in the above paragraph.

The background 37 of negative strip image 51 is removed by trimming the sides around the negative strip image 51. The horizontal edges of the negative strip image 51, for example edges 53, are found S8, and the edges 53 are enhanced by applying a threshold value, typically 30, to obtain a black and white image (i.e., the edge is given a value of zero and the remaining portion is given a value of 255). This black and white image should have a line running across the top of it corresponding to the top edge 53a of the negative strip 20. The top horizontal edge 53a of the negative strip 20 is used to calculate S10 the slope 38 of the strip 20a with respect to a horizontal axis of the scanner 55. This slope 38 is used with well known techniques to produce S12 an untilted negative strip image 70 (see FIG. 6B). Based on the slope 38, the strip image 20a is untilted by displacing vertically and downwardly or vertically and upwardly, depending on the slope as is well known in the art, each column of pixels by an amount equal to the amount of pixels occupied between the edge 53d and the horizontal axis 55. Any fractional amounts are rounded off.

Figure 6B:
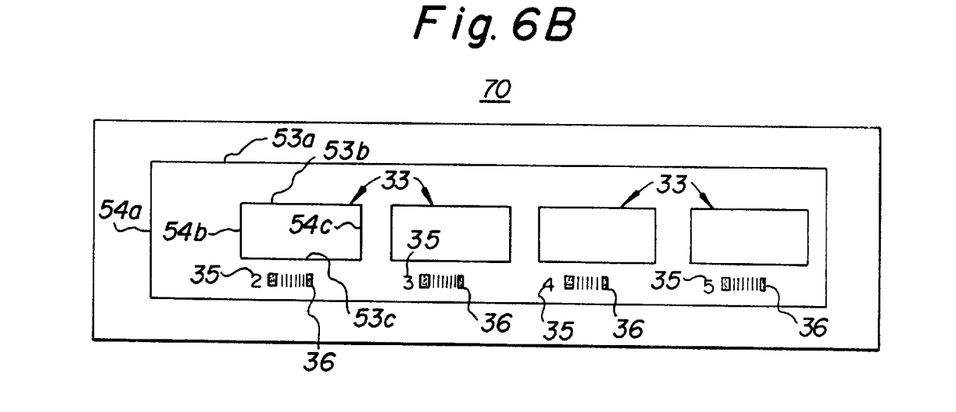
FIG. 6B is a front view of a portion of FIG. 6A.

All vertical edges of this image 70, for example edges 54 and each vertical edge of the barcode 36, are found S14, and a threshold, typically a code value of 30, is applied to obtain a black and white image. In step S16, the space between adjacent vertical edges 54 is examined in order to determine whether the spacing matches any of a plurality of predetermined spaces 54e–54m (see FIG. 4), indicative of typical barcodes, for locating the barcodes 36. If the barcodes 36 are found, based on their location and orientation, the untilted negative strip image 70 is re-oriented so that the barcodes 36 are on the bottom of the strip 70 and the frame numbers 34 read correctly. The resultant image is referred to as the correctly oriented negative strip image 70.

Referring briefly to FIGS. 3 and 4, some untilted negative strip image 70 may be in the upside-down 20b, backwards 20c or upside-down and backwards 20d, and in these cases, would need to be re-oriented for correcting the position, step S18. For example, if the barcode 36 is near the top and the number 35 is to the right of the barcode, as in strip 20b, the strip 70 is upside-down; therefore, flip the strip 70 around the horizontal axis. For correcting the backwards position 20c, determine if this untilted strip 70 is backwards by examining whether the tick marks 42 are to the right or left of the entry mark 40, or whether the tick marks 42 are to the right or left of the exit mark 44. If the entry mark 40 is used, the entry mark 40 is to the left of the tick marks 42 in the correct position; if not, flip the untilted negative strip 70 around the vertical axis. If the exit mark 44 is used, the exit mark 44 is to the right of the tick marks 42 in the correct position; if not, flip the untilted negative strip 70 around the vertical axis. Strip 20d is re-oriented for correcting its position by performing both steps that are performed in flipping strips 20b and 20c.

Each barcode 36 has a frame number 35 located to the left of the tick marks 42. The frame numbers 35 are cutout of the correctly oriented negative strip 70 image and each frame number 35 is written to a separate number image file in memory, step S20.

Figure 6C:
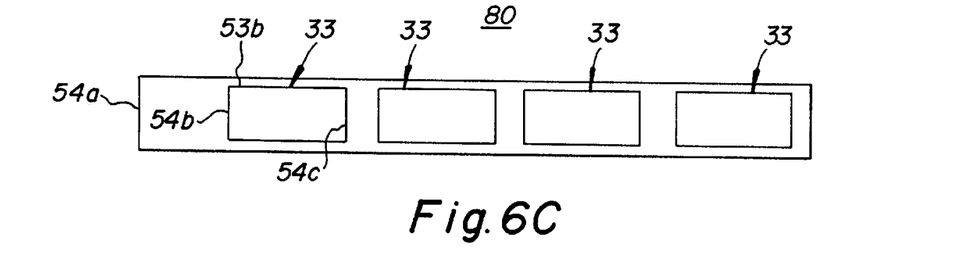
FIG. 6C is a front view of a portion of FIG. 6B.

If the barcode 36 is not found step S16 or after writing the frame numbers to file in step S20, an order image 80 (FIG. 6C) is determined. The order image 80 contains only the portion of the untilted strip 70 having the photographic images thereon, and is cutout in step S22. The top edge 53a of the strip 20a, which was previously determined, is used to calculate the line in the strip image where the frames 33 begin. The order image 80 is provided as input to the frame detection algorithm S24 (FDA) which determines the position at which each frame begins. The FDA is well known in the art, such as that disclosed in U.S. Pat. No. 5,414,779. The individual frames 33 are cutout of the order image 80 and each individual frame 33 is written to a separate file in memory, step S26. After all the frames 33 and, usually, frame numbers 35 have been written to files, the next negative strip 80 is processed in step S28 as described above. This process is repeated until the bottom of the scanned digital image 32 is reached.

Figure 7:
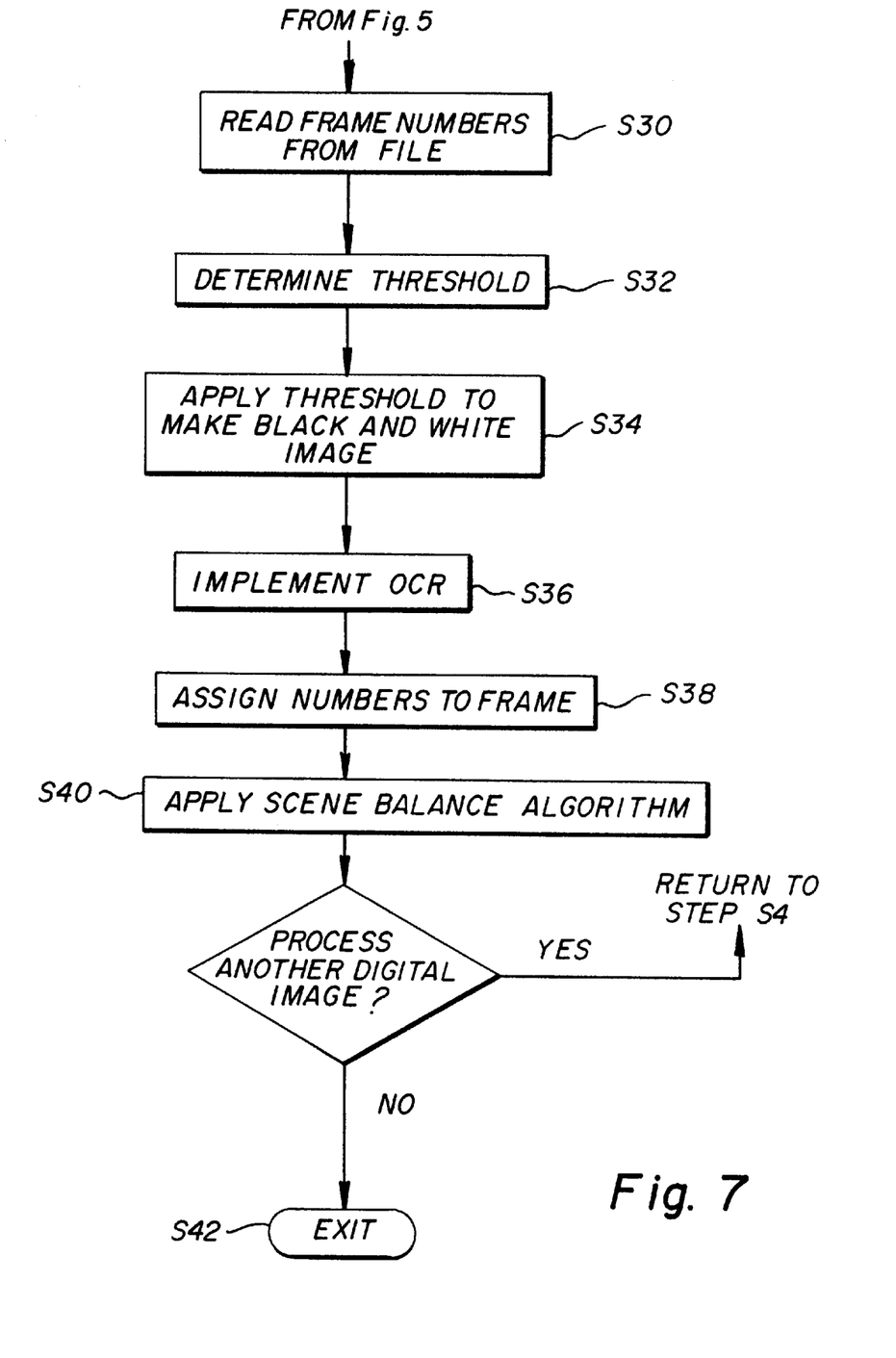
FIG. 7 is also a flowchart of a software program of the present invention typically implemented on the general purpose computer.

Referring to FIG. 7, a flowchart of the steps of a major subroutine after which each strip 20 has been processed is shown below. First, all the frame numbers are read sequentially from file, step S30, and thereafter their histograms are calculated, which calculation is well known in the art. From the histogram, determine a threshold value S32 so that code values below the threshold correspond to pixels that are part of the frame number 35. Determining a threshold is well known in the art, such as that disclosed in *The Image Processing Handbook*, Second Edition by John C. Russ. The threshold is applied, step S34, to the frame numbers 35 to make them black and white. In step S36, each black and white image is sent to an optical character recognition (OCR) routine, which is well known in the art, such as that disclosed in *The Polynomial Method Augmented by Supervised Training for Hand-Printed Character Recognition*, The international Conference on Artificial Neural Networks and Genetic Algorithms by P. G. Anderson and R. S. Gaborski, that determines the value of the number and the confidence with which the value was determined. The black and white image whose value was determined with the highest degree of confidence is used to assign numbers to the frames, step S38. The frame images 33 are converted to a positive image using a scene balance algorithm S40 such as that disclosed in U.S. Patent application Ser. No. 08/306,544 entitled *A Method and Apparatus for Exposure and Color Balance for Digital Color Negative Imaging Systems*. The positive images are pasted into the index image (see FIG. 2). In the lower left corner of each positive image, for example the number 10 as in the picture in the lower left corner of FIG. 2, a bit map number is pasted that corresponds to the frame number 35 and may be printed on the printer 28 as a hardcopy. After printing a hardcopy, the user may either exit the program S42 or return to step S4 if another composite digital image 32 is to be processed.

The invention has been described with reference to a preferred embodiment. However, it will be appreciated that variations and modifications can be effected by a person of ordinary skill in the art without departing from the scope of the invention.

Parts list:

computer system

10 number

12 unit

14 display

16 keyboard

18 scanner

20 negative strips

20a correctly oriented strip

20b upside-down strip

20c backward strip

20d upside-down and backwards strip

22 light source

24 detector

26 holder

28 printer

29 index print

30 picture

31 number 32 digital image
33 frame
34 frame numbers
35 frame number
36 bar code clock track
37 background
38 slope
40 entry mark
42 tick marks
44 exit mark
51 negative strip image
53 horizontal edges
54 vertical edge
55 scanner
55 horizontal axis
70 negative strip image
80 order image

We claim:

1. A system for creating an index print, generated from two or more detached negative strips, each strip having one or more frame images, independent of sequentially scanning each frame on the negative strips, the system comprising:
   (a) a scanner for substantially simultaneously creating a composite digital image of the negative strip from the negative placed on said scanner independent of the position or orientation of the negative on the scanner;
   (b) means for locating each of the two or more detached negative strips;
   (c) means for locating each digital representation in the composite digital image of the individual frame images on the negative strip; and
   (d) a printer for printing the index print from a signal from said locating means.

2. The system as in claim 1 further comprising means for determining a slope of the digital representation of the negative strip in the composite digital image.

3. The system as in claim 2 further comprising means for determining a numerical value of each digital representation in the composite digital image of individual frame numbers on the negative strip.

4. The system as in claim 3 further comprising means for associating a frame number with each image of the index print.

5. The system as in claim 1 further comprising means for determining the orientation of the digital representation and, when necessary, re-orienting the digital representation to a suitable orientation.

6. An article of manufacture comprising:
   a computer usable medium having computer readable code means embodied therein for creating a print index, generated from two or more detached negative strips, each strip having one or more frame images, independent of sequentially scanning each frame on the negative strip by placing the negative on a scanner for substantially simultaneously creating a composite digital image of the negative strip independent of the position or orientation of the negative on the scanner, the computer readable program code means in said article of manufacture comprising;
   (a) means for locating each of the two or more detached negative strips;
   (b) computer readable program code means for causing the computer to locate each digital representation in the composite digital image of the individual frame images on the negative strip.

7. The article of manufacture as in claim 6 further comprising computer readable program means for causing the computer to determine a slope of the digital representation of the negative strip in the composite digital image.

8. The article of manufacture as in claim 7 further comprising computer readable means for causing the computer to determine a numerical value of each digital representation in the composite digital image of individual frame numbers on the negative strip.

9. The article of manufacture as in claim 8 further comprising a computer readable means for causing the computer to associate a frame number with each image of the index print.

10. The article of manufacture as in claim 6 further comprising computer readable means for causing the computer to determine the orientation of the digital representation and, when necessary, re-orienting the digital representation to a suitable orientation.

11. A system for creating an index print, generated from a negative strip having one or more frame images, independent of sequentially scanning each frame on the negative strip, the system comprising:
   (a) a scanner for substantially simultaneously creating a composite digital image of the negative strip from the negative placed on said scanner independent of the position or orientation of the negative on the scanner by comparing a barcode on the negative strip to predetermined barcodes;
   (b) means for locating each digital representation in the composite digital image of the individual frame images on the negative strip; and
   (c) a printer for printing the index print from a signal from said locating means.

12. The system as in claim 11 further comprising means for determining a slope of the digital representation of the negative strip in the composite digital image.

13. The system as in claim 12 further comprising means for determining a numerical value of each digital representation in the composite digital image of the individual frame numbers on the negative strip.

14. The system as in claim 13 further comprising means for associating a frame number with each image of the index print.

15. The system as in claim 11 further comprising means for determining the orientation of the digital representation and, when necessary, re-orienting the digital representation to a suitable orientation.

* * * * *